Dec. 5, 1944.     W. E. PARKS     2,364,239
CLAMPING DEVICE

Filed Nov. 9, 1943     2 Sheets-Sheet 1

INVENTOR.
WESLEY E. PARKS
BY
Frank H Harmon
ATTORNEY

Dec. 5, 1944.　　　W. E. PARKS　　　2,364,239
CLAMPING DEVICE
Filed Nov. 9, 1943　　　2 Sheets-Sheet 2
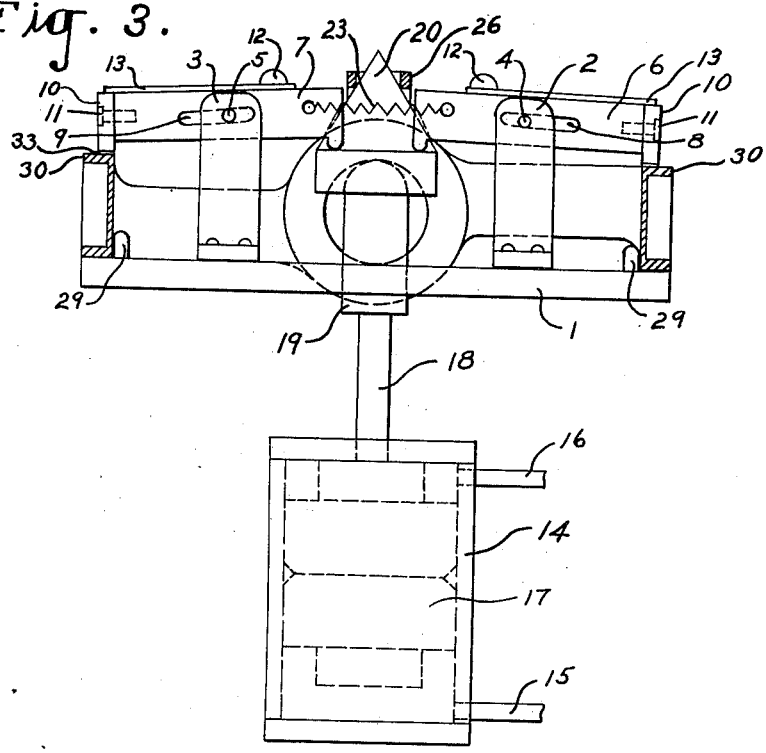
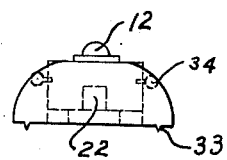
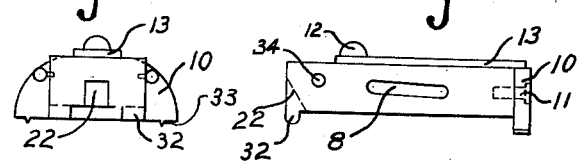
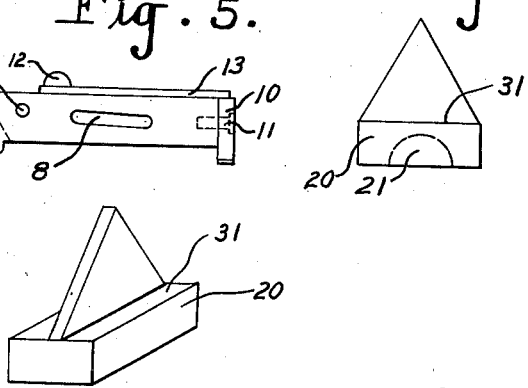
INVENTOR.
WESLEY E. PARKS
BY
Frank H. Harmon
ATTORNEY Patented Dec. 5, 1944

2,364,239

UNITED STATES PATENT OFFICE 2,364,239

CLAMPING DEVICE

Wesley E. Parks, Bedford, Ohio, assignor, by mesne assignments, to Jack & Heintz, Inc., Cleveland, Ohio, a corporation of Ohio Application November 9, 1943, Serial No. 509,629

4 Claims. (Cl. 90—60)

This invention relates in general to clamping devices and more particularly to improvements in clamping devices for fixedly holding work during a machining operation.

One of the primary objects of the invention is to provide a clamping device which will permit rapid alignment of a work piece in a position for a machining operation and will also permit rapid removal of the work from the machining position following an operational cycle.

A further object is to provide a clamping device having an hydraulically propelled clamping means for permitting rapid and firm engagement of a work piece as it is placed in a position for a machining operation and for permitting rapid disengagement from the work piece to allow quick removal of the work from the machining position following an operational cycle.

With these and other objects in mind, the invention resides in the combination of parts and in the details of construction and operation hereinafter set forth in the following specification and appended claims, certain embodiments thereof being illustrated in the accompanying drawings in which:

Figure 3 is a view in side elevation similar to Figure 2 except that the clamping arms of the device are shown engaging the gimbal frame.

Figure 4 is a detail view of a clamping arm of the device.

Figure 5 is a detail view of a clamping arm of the device.

Figure 6 is a detail view of a clamping arm of the device.

Figure 7 is a view in side elevation of the wedge portion of the device.

Figure 8 is an isometric view of the wedge portion of the device.

Figure 1:
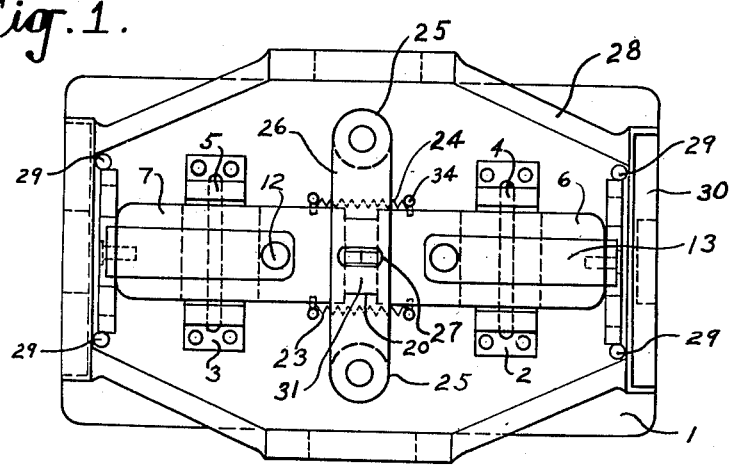
Figure 1 is a top plan view of the clamping device showing a work piece, in this case a gyro gimbal, supported on the base of the device but not clamped in position by the clamping arms.

Referring more particularly to the drawings, a base 1 is shown having two standards 2 and 3 supported thereon. Slidably and pivotally supported by means of pins 4 and 5 on the standards 2 and 3 are clamping arms 6 and 7. The pins 4 and 5 which are shown extending through slots 8 and 9 in the arms 6 and 7 respectively are fixed at each end to the standards 2 and 3.

A clamping plate 10 is pivotally attached, by means of a pivot screw 11, to the outer extremity of each clamping arm. Riveted to each clamping arm by rivet 12 is a plate 13 which projects a short distance beyond the end of the arm and contacts the upper surface of clamping plate 10. This plate 13 contacts the surface of plate 10 in order to resiliently hold the plate normally parallel to the base 1 of the device.

Figure 2:
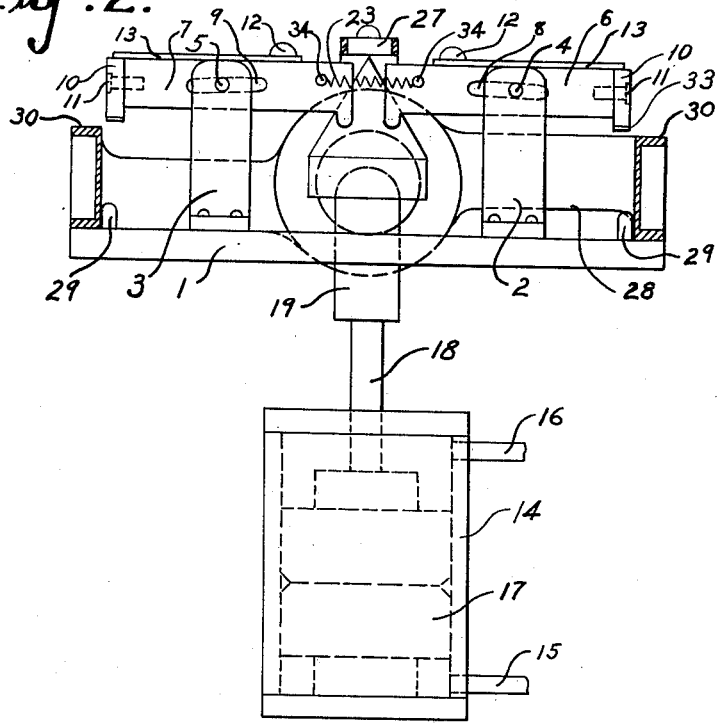
Figure 2 is a partially sectioned view in side elevation similar to Figure 1 but showing in addition an hydraulically actuated piston means for controlling the clamping action of the device.

In Figures 2 and 3 an hydraulic means, which is shown diagrammatically, consists of a cylinder 14, feed lines 15 and 16, a piston 17, and a piston rod 18 having an enlarged portion 19, this enlarged portion being hemispherical at the end. Positioned on the end of the piston rod is a wedge 20, shown in Figures 7 and 8. The wedge has a hemispherical detent 21 which fits on the end portion 19 of the piston rod and allows the wedge sliding contact therewith. No other means is used to key the wedge to the piston rod. The wedge engages a slot 22 in the clamping arms 6 and 7, and two springs 23 and 24 connecting the two arms together, cause the slotted portion of the arms to bear on the wedge, thereby causing the arms to maintain substantially parallel alignment with the base 1.

In Figure 1, two cylindrical standards 25 are shown supporting a bar member 26 having a slot 27. The wedge 20, upon moving upwardly, projects through the slot 27 a short distance as seen in Figure 3. The purpose of this slotted bar member will be described later in this specification.

Figures 1 and 2 show a gimbal 28 in the unclamped stage, while Figure 3 shows the gimbal in the clamped stage. When it is desired that the gimbal be fixed in a position on the clamp, it is placed in the position shown in Figure 1 with indexing studs 29 acting in coordination with the overhanging portion of the gimbal to align the gimbal properly on the base for a machining operation by machine tools which are not shown in the drawings. The overhanging portions of the gimbal prevent lateral movement and the studs prevent longitudinal movement of the gimbal with respect to the base 1.

When the arms 6 and 7 are in the position shown in Figures 1 and 2, piston 17 is in the retracted position. Upon opening a valve, not shown, in the hydraulic line 15, fluid under pressure is admitted to the cylinder below the piston 17 forcing it upward. By means of the same control valve, fluid is exhausted from above the piston by means of line 16. As the piston moves upward, the wedge 20 also moves upward. As a result of this upward wedge movement, arms 6 and 7 first rotate slightly clockwise and counterclockwise respectively about their pins 4 and 5. This pivotal movement is stopped when the two adjacent ends of the arms contact the under surface of bar 26. Further upward movement of the wedge causes the arms to move outwardly from the center of the device against the action of springs 23 and 24 until the clamping plate 10 is in vertical alignment with the end portions 30 of the gimbal. As the arms reach this position, the ledge section 31 of the wedge 20 contacts the feet 32 on arms 6 and 7. As the movement of the wedge by the piston is being completed, further rotation of the arms 6 and 7 about their pivots 4 and 5 occurs and knife edged feet 33 on the plate 10 are made to contact the gimbal end portions 30, thereby securely clamping the gimbal to the base 1 as shown in Figure 3.

When the hydraulic pressure below piston 17 is removed, it descends rapidly and the arms 6 and 7 snap back to their original position as in Figure 2 under the action of springs 23 and 24. It should be noted that the studs 34 which hold the springs are fixed to the sides of arms 6 and 7 at a point slightly above the pivot points 4 and 5 of the arms 6 and 7. Consequently the springs 23 and 24 not only bring the arms 6 and 7 closer together but cause the arms to rotate back to their original horizontal positions prior to moving toward each other, thereby eliminating the possibility of an arm engaging the cross bar 26 on the return movement.

It is realized that the actuation of the wedge could be manually controlled or that other suitable hydraulic or cam controls could be utilized. The hydraulic means shown herein is used merely for illustrative purposes and not in a limiting sense.

I claim:

1. A clamping device comprising a base, two standards mounted on the base, complementary spaced clamping devices pivotally and slidably attached to each standard, resilient means normally forcing said devices toward each other, a slidably mounted wedge normally positioned so as to bear on the adjacent ends of the clamping devices and operable to spread the two apart against the action of said resilient means.

2. A clamping device comprising a base, two standards mounted on the base, complementary spaced clamping devices pivotally and slidably attached to each standard, resilient means normally forcing said devices toward each other, a slidably mounted wedge normally positioned so as to bear on the adjacent ends of the clamping devices and operable to spread the two apart against the action of said resilient means, means for limiting the resulting pivotal movement and guiding the linear movement of said clamping devices into work engaging position.

3. A clamping device comprising a base, two standards mounted on the base, complementary spaced clamping devices pivotally and slidably attached to each standard, resilient means normally forcing said devices toward each other, a slidably mounted wedge normally positioned so as to bear on the adjacent ends of the clamping devices and operable to spread the two apart against the action of said resilient means, means for limiting the resulting pivotal movement and guiding the linear movement of said clamping devices into work engaging position, and means for automatically returning said clamping devices to normal non-engaging position upon release of said clamping device spreading wedge member.

4. A clamping device comprising a base, a pair of standards mounted on the base, a clamping arm pivotally and slidably attached to each standard, clamping plates pivoted on the end of and at right angles to the clamping arms, a pair of resilient plates attached at one end to each clamping arm and having their free ends contacting said clamping plates, a pair of springs, one on either side of a clamping arm, connecting the two adjacent ends of the clamping arms together, a hydraulically operated piston rod, a wedge slidably mounted thereon and normally positioned so as to bear on the adjacent ends of the clamping arms, and a pair of additional standards, one mounted on either side of the wedge and carrying a slotted cross bar limit and guide member in close proximity with the point of the wedge and the adjacent ends of the clamping arms to limit the pivotal movement and guide the linear movement of said clamping arms.

WESLEY E. PARKS.